(12) United States Patent
Svoboda et al.

(10) Patent No.: US 10,468,668 B1
(45) Date of Patent: Nov. 5, 2019

(54) METHODS AND COMPOSITIONS FOR ANODE AND CATHODE NANOCOMPOSITE MATERIALS FOR THERMAL BATTERIES

(71) Applicants: Georgia Tech Research Corporation, Atlanta, GA (US); Binergy Scientific, Inc., Atlanta, GA (US)

(72) Inventors: Vojtech Svoboda, Atlanta, GA (US); Gleb Yushin, Atlanta, GA (US)

(73) Assignees: Binergy Scientific, Inc., Atlanta, GA (US); Georgia Tech Research Corporation, Atlanta, GA (US)

( * ) Notice: Subject to any disclaimer, the term of this patent is extended or adjusted under 35 U.S.C. 154(b) by 53 days.

(21) Appl. No.: 15/249,810

(22) Filed: Aug. 29, 2016

Related U.S. Application Data

(60) Provisional application No. 62/210,639, filed on Aug. 27, 2015, provisional application No. 62/244,108, filed on Oct. 20, 2015.

(51) Int. Cl.
| | |
|---|---|
| H01M 4/06 | (2006.01) |
| H01M 4/133 | (2010.01) |
| H01M 4/134 | (2010.01) |
| H01M 4/136 | (2010.01) |
| H01M 4/40 | (2006.01) |
| H01M 4/58 | (2010.01) |
| H01M 4/583 | (2010.01) |
| H01M 4/62 | (2006.01) |
| H01M 6/36 | (2006.01) |
| H01M 10/0525 | (2010.01) |
| H01M 4/36 | (2006.01) |
| H01M 4/02 | (2006.01) |

(52) U.S. Cl.
CPC .............. *H01M 4/134* (2013.01); *H01M 4/06* (2013.01); *H01M 4/133* (2013.01); *H01M 4/136* (2013.01); *H01M 4/366* (2013.01); *H01M 4/405* (2013.01); *H01M 4/582* (2013.01); *H01M 4/583* (2013.01); *H01M 4/62* (2013.01); *H01M 4/621* (2013.01); *H01M 4/625* (2013.01); *H01M 4/626* (2013.01); *H01M 6/36* (2013.01); *H01M 10/0525* (2013.01); *H01M 2004/027* (2013.01); *H01M 2004/028* (2013.01)

(58) Field of Classification Search
CPC ........ H01M 4/06; H01M 4/133; H01M 4/134; H01M 4/136; H01M 4/366; H01M 4/405; H01M 4/582; H01M 4/583; H01M 4/62; H01M 4/621; H01M 4/625; H01M 4/626; H01M 6/36; H01M 10/0525
See application file for complete search history.

(56) References Cited

U.S. PATENT DOCUMENTS

| | | | |
|---|---|---|---|
| 3,498,843 A | 3/1970 | Hunt et al. | |
| 3,591,416 A | 7/1971 | Johnson | |
| 4,383,014 A | 5/1983 | Armijo et al. | |
| 6,475,662 B1 | 11/2002 | Spencer | |

(Continued)

*Primary Examiner* — Brittany L Raymond
(74) *Attorney, Agent, or Firm* — Meunier Carlin & Curfman LLC

(57) ABSTRACT

Disclosed herein are compositions and methods of making such compositions, for making lithium-containing anodes and cathodes. Disclosed are batteries comprising such anodes and/or cathodes, and uses for such batteries. This abstract is intended as a scanning tool for purposes of searching in the particular art and is not intended to be limiting of the present disclosure.

10 Claims, 7 Drawing Sheets

(56) References Cited

U.S. PATENT DOCUMENTS

| | | |
|---|---|---|
| 7,871,447 B2 | 1/2011 | Dixon et al. |
| 8,932,764 B2 | 1/2015 | Yushin et al. |
| 2002/0025471 A1 | 2/2002 | Velez et al. |
| 2003/0211383 A1 | 11/2003 | Munshi et al. |
| 2004/0137318 A1 | 7/2004 | Dekel et al. |
| 2008/0299447 A1* | 12/2008 | Fujiwara ............... H01M 6/24 429/103 |
| 2009/0035664 A1 | 2/2009 | Chiang et al. |
| 2009/0197176 A1 | 8/2009 | Kim et al. |
| 2012/0135276 A1 | 5/2012 | Rastegar |
| 2013/0323607 A1* | 12/2013 | Issaev ............... H01M 2/1653 429/338 |
| 2014/0170524 A1* | 6/2014 | Chiang ............... H01M 8/188 429/482 |
| 2014/0272504 A1 | 9/2014 | Edington et al. |
| 2014/0291575 A1* | 10/2014 | Gao ............... C01B 33/02 252/182.1 |
| 2015/0236344 A1 | 8/2015 | Ramaswamy et al. |
| 2016/0013499 A1* | 1/2016 | Swift ............... H01M 6/36 429/112 |
| 2016/0079609 A1 | 3/2016 | Choi et al. |
| 2016/0087263 A1 | 3/2016 | Gadkaree et al. |

\* cited by examiner

METHODS AND COMPOSITIONS FOR ANODE AND CATHODE NANOCOMPOSITE MATERIALS FOR THERMAL BATTERIES

CROSS-REFERENCE TO RELATED APPLICATIONS

This Application claims the benefit of the filing date and priority of U.S. Provisional Application Nos. 62/210,639, filed on Aug. 27, 2015, and 62/244,108, filed on Oct. 20, 2015, each of which is incorporated herein by reference in its entirety.

STATEMENT REGARDING FEDERALLY SPONSORED RESEARCH

This invention was made with government support under grant number N68936-14-C-0095 awarded by the United States Navy, Department of Defense. The United States government has certain rights in the invention.

BACKGROUND

Thermal batteries are single discharge reserve batteries that provide very long shelf life, e.g., often greater than 25 years, minimal self-discharge, wide storage temperature range, fast activation under sudden power demand, and wide range of temperature operating conditions. This is provided with application of molten salt electrolyte, which is in solid form under normal conditions and provides practically negligible ionic conductivity. This minimizes degradation mechanisms and self-discharge, and maximizes shelf life at wide storage temperature range. Under power demand, an internal pyrotechnic charge is activated and generates sufficient heat to elevate the battery temperature over melting temperature of the molten salt electrolyte (typically above 350° C.). The battery thermal activation allows for fast ion mobility, increase in battery voltage, and utilization of the charge transfer reaction.

Previously, the most advanced common configurations of thermal batteries featured lithium-silicon alloy powder as anode material, $FeS_2$ as cathode material, and an eutectic electrolyte such as LiCl—KCl or halide electrolyte mixture of LiCl—LiF—LiBr. These configurations operate at voltage less than 2 V and the capacity is limited, e.g., limited to 485 mAh/g for $Li_{13}Si_4$ alloy, and 335 mAh/g for $FeS_2$. These configurations cannot meet the requirements of new applications that are demanding high power and energy density. Moreover, the manufacturing of batteries based on these materials is hazardous due to the use of very reactive components in the anode.

Despite advances in thermal battery research, there is still a scarcity of methods and compositions that allow for high performance thermal batteries with the enhanced discharge capacity, improved discharge power, increased cell voltage, and the energy required, for example, for current munitions and defense applications, while at the same time allow for less hazardous manufacturing. What is needed are compositions and anodes, cathodes and batteries comprising compositions that meet this need for improved function.

SUMMARY

In accordance with the purpose(s) of the disclosure, as embodied and broadly described herein, disclosed herein are anode and cathode compositions that when used in a battery, e.g., a thermal battery, provide for batteries with characteristics including, but not limited to, improved specific discharge capacity, specific discharge power, increased cell voltage, and specific energy. Disclosed herein are methods of preparing the disclosed anode and cathode compositions. The methods and compositions disclosed herein are useful in a variety of defense applications, munition technologies, space exploration, oil and gas industry, aviation, safety equipment, medical equipment. Disclosed herein are articles such as batteries comprising disclosed anode and cathode compositions.

Disclosed herein are anode compositions comprising a metallic lithium a lithium alloy, and a lithium alloying additive. In an aspect, the lithium alloy is Li—Si, Li—Al, Li—V, $LiCoO_2$, $LiMnO_2$, $LiFePO_4$; or Li—C. In an aspect, the lithium alloy is present in an amount of about 0 wt % to about 99 wt %. In an aspect, the lithium alloying additive is Sn, Si, Al, Ti, V, Mg, Mn, Ge, C, S, Sb, Zn, Ge, $CoO_2$, $NiO_2$, $MgO_2$, $FePO_4$, $MnPO_4$, $CoPO_4$, $NiPO_4$, and layered oxides such as $[Ni_{1/3}Mn_{1/3}Co_{1/3}]O_2$, $[Li_{0.2}Mn_{0.6}Ni_{0.2}]O_2$, $[Ni_{0.7}Mn_{0.15}CO_{0.15}]O_2$. In an aspect, the lithium alloying additive has a particle size of about 1 nm to about 500 μm. In an aspect, the lithium alloying additive is present in an amount of about 0 wt % to about 80 wt %. In an aspect, a composition comprises a total lithium content in an amount of about 1 to about 99 wt %, provided that the total wt % of the components does not exceed 100 wt %.

Disclosed herein are cathode compositions comprising a carbon-coated metal fluoride. In an aspect, the carbon-coated fluoride is carbon-coated $FeF_2$, $FeF_3$, $CuF_2$, $BiF_3$, $BiF_5$, $CoF_2$, $CoF_3$, or combinations thereof. In an aspect, the carbon-coated metal fluoride is carbon-coated $FeF_3$. In an aspect, the compositions comprising a carbon-coated metal fluoride can further comprise a binder for molten electrolyte retention. In an aspect, the molten electrolyte binder is MgO, CaO, $SiO_2$, $Al_2O_3$, $TiO_2$, $ZrO_2$, $ZrSiO_4$, ceramic fibers, kaolin clay, fumed silica, fumed titania, alumina, an inert oxide, or combinations thereof. In an aspect, the compositions comprising a carbon-coated metal fluoride can further comprise an additional cathode additive. In an aspect, the additional cathode additive is a carbon material, nickel, copper, iron, or aluminum.

Disclosed herein are anodes comprising the disclosed anode compositions.

Disclosed herein are cathodes comprising the disclosed cathode compositions.

Disclosed herein are electrolytes comprising a disclosed electrolyte composition.

Disclosed herein are batteries comprising a disclosed anode, a disclosed cathode, a disclosed electrolyte, and combinations thereof. Disclosed herein are methods of making disclosed anodes, disclosed cathodes, disclosed electrolytes and batteries comprising one or more of disclosed anodes, cathodes or electrolytes and articles. Disclosed are methods for using batteries comprising, one or more of disclosed anodes, cathodes or electrolytes.

Disclosed herein are articles such as an anode, a cathode, a battery, a thermal battery, or devices comprising the disclosed anode, cathode, battery, or thermal battery.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the disclosure.

FIG. 5A shows an arrangement of cathode particles. FIG. 5B shows an internal architecture of one of the particles, and FIG. 5C shows a diagram of a portion of the particle surface.

Figure 1:
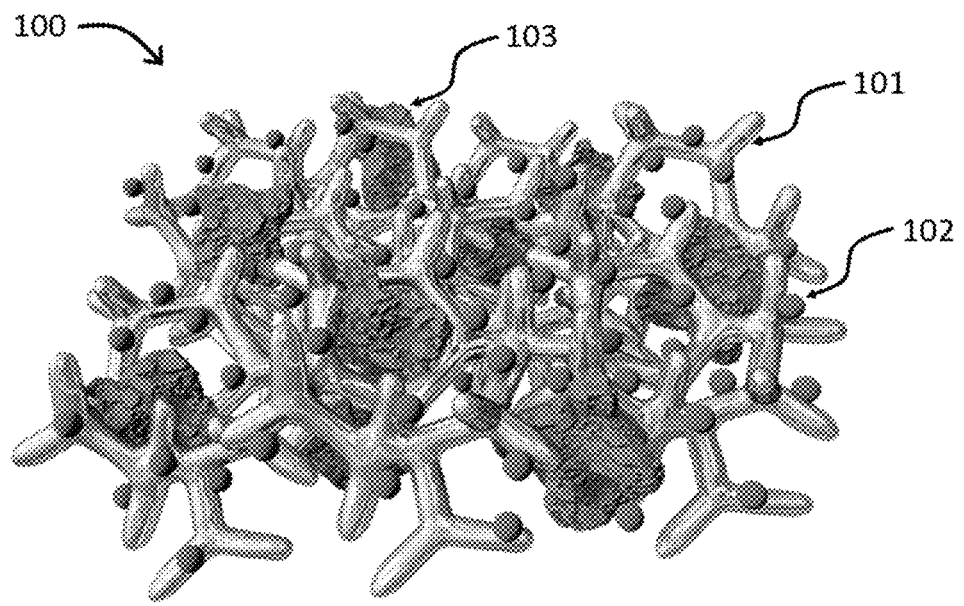
FIG. 1 shows a schematic representation of a nanostructure composite 100 for a disclosed anode comprising a disclosed lithium alloy 103; metallic lithium 101; and a disclosed lithium alloying additive 102.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

The disclosure can be understood more readily by reference to the following detailed description and the Examples included herein.

As used in the specification and the appended claims, the singular forms "a," "an" and "the" include plural referents unless the context clearly dictates otherwise. Thus, for example, reference to "an anode," "a cathode," or "a battery" includes aspects of two or more such anodes, cathodes, or batteries, and the like.

Ranges can be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms an aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. % or wt %) of a component, unless specifically stated to the contrary, is based on the total weight of the formulation or composition in which the component is included.. It is to be understood herein that the total wt % of the components in a disclosed composition does not exceed 100 wt %.

As used herein, the terms "optional" or "optionally" means that the subsequently described event or circumstance can or can not occur, and that the description includes instances where the event or circumstance occurs and instances where it does not.

As used herein, an "electrochemical device" may otherwise be referred to as a battery, e.g., a thermal battery, a capacitor, a cell, an electrochemical cell, or the like. It should be understood that these references are not limiting, and any device that involves electron transfer between an electrode and an electrolyte is contemplated within the scope of the present disclosure. Further, an electrochemical device may refer to single or multiple connected electrochemical devices, electrochemical cells, batteries or capacitors capable of supplying energy to a load, and none of the references herein to any particular device should be considered to limit the disclosure in any way. In one or more aspects of the disclosure, the electrochemical device is a thermal battery.

As used herein, "about" means plus or minus 10% of the specified value. The term "about" as used herein is not intended to limit the scope of the disclosure but instead encompass the specified material, parameter or step as well as those that do not materially affect the basic and novel characteristics of the disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

In an aspect, the disclosure relates to anode and cathode compositions that when used in a battery, e.g., a thermal battery, provide for batteries with improved specific discharge capacity, specific discharge power, increased cell voltage, and specific energy. The disclosure also pertains to methods of preparing the disclosed anode and cathode compositions. The disclosure further pertains to articles such as batteries, e.g., a thermal battery, comprising the disclosed anode and/or cathode compositions. The disclosed articles, methods, and compositions for anode and cathode materials are useful in a variety of defense applications, munition technologies, space exploration, oil and gas industry, aviation, safety equipment, and medical equipment.

In an aspect, the disclosure relates to anode compositions and methods of preparing same. In an aspect, the disclosure relates to anode compositions comprising a metallic lithium: a lithium alloy and a lithium alloying additive. In an aspect, the anode compositions have a nanostructure composite structure, e.g., Me structure shown schematically in FIG. 1, comprising metallic lithium, a lithium alloy, and a lithium alloying additive. In an aspect, and without wishing to be bound by a particular theory, it is believed that the disclosed anode compositions can form an in situ-formed lithium alloy nanostructure network that has the following improved properties: (i) it wets with molten Li and thus supports the retention of the molten Li in the anode; (ii) it also wets with molten salt electrolyte and supports electrolyte retention and large electrode-electrolyte interfacial area; (iii) the micro-, meso-, and macro-porosity provides capillary force retention for molten lithium and the molten electrolyte; (iv) it hardens the anode and increases the anode's mechanical stability; (v) the in situ-formed lithium alloy is ionically and electrically conductive and supports $Li^+$ ion and electron transport in the anode; and (vi) at high depth of discharge, the in situ-formed lithium alloy can be delithiated and contribute to discharge capacity of the anode.

In an aspect, the anode composition comprises a metallic lithium. An exemplary metallic lithium useful in the disclosed compositions is a. stabilized lithium powder comprising a protective coating. For example, Lectro® Max Powder is a suitable Stabilized Lithium Metal Powder (SLMP) fabricated by FMC Lithium (Charlotte, N.C.). This SLMP® powder can be provided as spherical particles of diameter of 25-50 μm that consists of 97 wt % metallic lithium coated with $Li_2CO_3$ (0.5 wt %) surface protective layer. The SLMP® can be safely handled in air in dry room conditions, and it allows for safe and easy handling of metallic lithium for the anode composition during the anode production. In an aspect, the metallic lithium can be in the form of powder, particles, granules, flakes, or sheets of size 1 nm-500 μm. In an aspect, the metallic lithium can be in the form of powder, particles, granules, flakes, or sheets with a protective coating and of size 1 nm-500 μm. In an aspect, the metallic lithium can be in the form of powder, particles, granules, flakes, or sheets without a protective coating and of size 1 nm-500 μm.

In an aspect, the anode composition comprises a lithium alloy including, but is not limited to, Li—Si, Li—Al, Li—V, Li—Mg, Li—C, Li—S, Li—Sb, Li—Ge, Li—Zn, Li—Bi, $LiCoO_2$, $LiNiO_2$, $LiMnO_2$, $LiFePO_4$, LiMnPO4, $LiNiPO_4$, $LiVO_3$, $Li_2SO_4$, $LiNO_3$, and and $Li_2MoO_4$, and layered oxides. In an aspect, the lithium allow is Li—Si, Li—Al, Li—Ti, Li—V, Li—Bi, $LiCoO_2$, $LiMnO_2$, $LiFePO_4$, or Li—C. In an aspect, the lithium alloy is Li—Si. In an aspect, the lithium alloy comprises one or more of LiC, $Li_4C_3$, $LiC_6$, $Li_{22}Si_5$, $Li_{13}Si_4$, $Li_7Si_3$, $Li_{12}Si_7$. In an aspect, the lithium alloy comprises $Li_{22}Si_5$. In an aspect, an anode composition comprises $Li_{13}Si_4$. In an aspect, an anode composition does not comprise $Li_{13}Si_4$. In an aspect, an anode composition does not contain a Li—Si alloy, and the Li—Si is eliminated or replaced with a lithium-free or low lithium content alloys of compounds such as Si, Al, Ti, V, Mg, Mn, Bi, Ge, C, S, Sn, Sb, Zn, Ge, cobalt oxide, nickel oxide, manganese oxide, iron phosphate, and other layered oxides.

In an aspect, the lithium alloy is present in an amount of about 1 wt % to about 99 wt %, and ranges therein between. In an aspect, the lithium alloy is present in an amount of about 15 wt % to about 35 wt %. In an aspect, the lithium alloy is present in an amount of about 20 wt % to about 30 wt %. In an aspect, a lithium alloying additive can be present in an amount from about 1 wt % to about 25 wt %, about 1 wt % to about 5 wt %, from about 5 wt % to about 10 wt %, from about 5 wt % to about 15 wt %, from about 10 wt % to 15 wt %, from about 10 wt % to 20 wt %, from about 20 wt % to about 25 wt %, from about 20 wt % to about 30 wt %, from about 10 wt % to about 30 wt %, from about 15 wt % to about 35 wt %, from about 20 wt % to about 40 wt %, from about 15 wt % to 45 wt %, from about 35 wt % to about 50 wt %, from about 5 wt % to 55 wt %, from about 50 wt % to about 60 wt %, from about 40 wt % to about 65 wt %, from about 50 wt % to about 70 wt %, or about 75 wt % to 80 wt %. In an aspect, a lithium alloying additive can be present in an amount of about 5 wt %, , 5.5 wt %, 6 wt %, 6.5 wt %, 7 wt %, 7.5 wt %, 8 wt %, 8.5 wt %, 9 wt %, 9.5 wt %, 10 wt %, 10.5 wt %, wt %, 11.5 wt %, 12 wt %, 12.5 wt %, 13 wt %, 13.5 wt %, 14 wt %, 14.5 wt %, 15 wt %, 15.5 wt %, 16 wt %, 16.5 wt %, 17 wt %, 17.5 wt %, 18 wt %, 18.5 wt %, 19 wt %, 19.5 wt %, or 20 wt %, or any combination thereof, or any range comprised by the foregoing.

In an aspect, and without wishing to be bound by a particular theory, it is currently thought that the lithium alloy in the anode composite provides multiple features for an anode: (i) the lithium alloy is wetted by the molten Li present in the anode and thus increases molten Li retention in the anode, and increases the molten Li ionic and electronic contact area in the anode; (ii) the lithium alloy provides capillary retention of molten lithium between the individual particles making up the anode, (iii) together with the lithiated alloying additive, the lithium alloy is a building block of the internal nanostructure network that retains the molten lithium and molten electrolyte in the anode; (iv) the lithium alloy material is rigid and supports the mechanical structure of the anode under compression; (v) the lithium alloy is ionically and electrically conductive and supports $Li^+$ ion and electron transport in bulk in the anode; (vi) at high depth of discharge, the lithium alloy can be delithiated and contribute to the discharge capacity of the anode.

In an aspect, the anode composition comprises a lithium alloy additive including, but are not limited to, Sn, Si, Al, Ti, V, Mg, Mn, Ge, C, S, Sb, Zn, Ge, $CoO_2$, $NiO_2$, $MgO_2$, $FePO_4$, $MnPO_4$, $CoPO_4$, $NiPO_4$, and layered oxides such as $[Ni_{1/3}Mn_{1/3}Co_{1/3}]O_2$, $[Li_{0.2}Mn_{0.6}Ni_{0.2}]O_2$, $[Ni_{0.7}Mn_{0.15}Co_{0.15}]O_2$, or combinations thereof. In an aspect, the anode composition comprises a lithium alloy additive including, but are not limited to, Sn, Si, Al, Ti, V, Mg, Mn, Ge, C, S, Sb, Zn, or Ge, or combinations thereof. In an aspect, the anode composition comprises a lithium alloy additive is Sn.

In an aspect, the lithium alloying additive alloys with lithium upon contact with lithium metal. For example, Sn readily alloys with Li, and the resulting alloy ($Li_{22}Sn_5$) has a higher melting point (783° C.) than does metallic lithium (180.5° C.) and is above the typical operating temperature of thermal batteries, which is 350-550° C.

In an aspect, a lithium alloy additive can be replaced with metal particles that do not alloy with lithium, e.g., Fe, Ni, and Cu. Without wishing to be bound by a particular theory, it is currently believed that the non-alloying particles do not contribute to discharge capacity and will reduce specific charge of the anode, but such materials can improve mechanical stability, increase hardness, and improve electric conductivity, and the capillary retention of molten lithium and electrolyte in the anode.

In an aspect, the lithium alloying additive can be in any form that functions in the anode, such as fibers, nanowires, tubes, particles and nanoparticles of any shape, grid, and mesh.

In an aspect, a lithium alloying additive can be present in an amount from about 0 wt % to about 80 wt % with a particle size from about 1 nm to about 500 μm.

In an aspect, the lithium alloying additive is present in an amount of about 0 wt % to about 80 wt %; wherein the total lithium content present is in an amount of about 1 to about 99 wt %, and ranges therein between. In an aspect, a lithium alloying additive can be present in an amount greater than 1 wt %, 2 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, or 75 wt %. In an aspect, a lithium alloying additive can be present in an amount from about 1 wt % to about 25 wt %, about 1 wt % to about 5 wt %, from about 5 wt % to about 10 wt %, from about 5 wt % to about 15 wt %, from about 10 wt % to 15 wt %, from about 10 wt % to 20 wt %, from about 20 wt % to about 25 wt %, from about 20 wt % to about 30 wt %, from about 10 wt % to about 30 wt %, from about 15 wt % to about 35 wt %, from about 20 wt % to about 40 wt %, from about 15 wt % to 45 wt %, from about 35 wt % to about 50 wt %, from about 5 wt % to 55 wt %, from about 50 wt % to about 60 wt %, from about 40 wt % to about 65 wt %, from about 50 wt % to about 70 wt %, or about 75 wt % to 80 wt %. In an aspect, a lithium alloying additive can be present in an amount of about 5 wt %, 5.5 wt %, 6 wt %, 6.5 wt %, 7 wt %, 7.5 wt %, 8 wt %, 8.5 wt %, 9 wt %, 9.5 wt %, 10 wt %, 10.5 wt %, 11 wt %, 11.5 wt %, 12 wt %, 12.5 wt %, 13 wt %, 13.5 wt %, 14 wt %, 14.5 wt %, 15 wt %, 15.5 wt %, 16 wt %, 16.5 wt %, 17 wt %, 17.5 wt %, 18 wt %, 18.5 wt %, 19 wt %, 19.5 wt %, or 20 wt %, or any combination thereof, or any range comprised by the foregoing.

In an aspect, the size of the lithium alloying additive is from about 1 nm to about 500 μm. In an aspect, the lithium alloying additive is a nanoparticle. In an aspect, the lithium alloying additive has a size of about 1 nm to about 1000 nm. Nanoparticles have high aspect ratio between the surface area and mass, and this supports rapid and homogeneous alloying. In an aspect, a lithium alloying additive has a particle size of greater than 1 nm, 10 nm, 25 nm, 40 nm, 50, 75 nm, 100, 120 nm, 150 nm, 160 nm, 180 nm, 200 nm, 300 nm, 350 nm, 400 nm, 500 nm, 700 nm, 800 nm, 1 μm, 10 μm, 20 μm, 50 μm, 100 μm, 150 μm, 200 μm, 250 μm, 300 μm, 350 μm, 400 μm, or 450 μm. In an aspect, the lithium alloying additive is a nanoparticle having a particle size of about 1 nm to about 100 nm, and all ranges thereinbetween.

In an aspect, and without wishing to be bound b a particular theory, it is currently thought that the lithium alloying additive contacts the metallic lithium and facilitates self-formation of a lithium alloy by an in situ alloying process, for an in situ-formed lithium alloy. The in situ alloying process is self-actuated and the kinetics of the in situ alloying can he thermally controlled, e.g., accelerated by elevated temperatures to facilitate rapid formation of the in situ-formed lithium alloy. Kinetics of the in situ alloy formation can be reduced by levering temperature. In an aspect, the lithium alloying additive is homogeneously dispersed in the anode composition, which is also referred to herein as an anode composite powder mixture. The homogeneous dispersion of the lithium alloying additive facilitates uniformly distributed internal in situ-formed alloy clusters and nanostructure network throughout the anode, such as in an anode palette made by press-production.

In an aspect, the anode composition can further comprise one or more of LiCl, LiBr, LiF, KCl, KBr, LiI, KI, a carbon nanotube, a carbon nanoparticle, graphene, MgO, CaO, $SiO_2$, $Al_2O_3$, $TiO_2$, $ZrO_2$, $ZrSiO_4$, a ceramic fiber, kaolin clay, fumed silica, fumed titania, alumina, or an inert oxide.

In an aspect, the total lithium content in the anode composition can be present in an amount from about 1 wt % to about 99 wt %, or in an amount of about 2 wt %, 5 wt %, 10 wt %, 15 wt %, 20 wt %, 25 wt %, 30 wt %, 35 wt %, 40 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, or 99 wt %. The total lithium percentage in the anode can be greater than 5 wt %, 10 wt %, 20 wt %, 30 wt %, 40 wt %, 50 wt %, 60 wt %, 70 wt %, 80 wt %, with % 90 wt %, 95 wt %, or greater than 98 wt %.

In an aspect, the total lithium content can be present in an amount of about 90 wt % to about 99 wt %, or in an amount of about 90 wt %, 91 wt %, 92 wt %, 93 wt %, 94 wt %, 95 wt %. 96 wt %, 97 wt %, wt %, or 99 wt %.

In an aspect, the total lithium content can be present in an amount of about 80 wt % to about 99 wt %, or in an amount of about 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, wt %, 96 wt %, 97 wt %, 98 wt %, or 99 wt %. In an aspect, the total lithium content can be present in an amount of about 80 wt % to about 95 wt %, or in an amount of about 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, or 95 wt %. In an aspect, the total lithium content can be present in an amount of about 80 wt % to about 90 wt %, or in an amount of about 80 wt %, 81 wt %, 82 wt %, 83 wt %, 84 wt %, 85 wt %, 86 wt %, 87 wt %, 88 wt %, 89 wt %, or 90 wt %.

In an aspect, the total lithium content can be present in an amount of about 70 wt % to about 99 wt %, or in an amount of about 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, or 99 wt %. In an aspect, the total lithium content can be present in an amount of about 70 wt % to about 90 wt %, or in an amount of about 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %. In an aspect, the total lithium content can be present in an amount of about 70 wt % to about 85 wt %, or in an amount of about 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %. In an aspect, the total lithium content can be present in an amount of about 70 wt % to about 80 wt %, or in an amount of about 70 wt %, 71 wt %, 72 wt %, 73 wt %, 74 wt %, 75 wt %, 76 wt %, 77 wt %, 78 wt %, 79 wt %, 80 wt %.

In an aspect, the total lithium content can be present in an amount of about 60 wt % to about 90 wt %, or in an amount of about 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %. In an aspect, the total lithium content can be present in an amount of about 60 wt % to about 85 wt %, or in an amount of about 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %. In an aspect, the total lithium content can be present in an amount of about 60 wt % to about 80 wt %, or in an amount of about 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %.

In an aspect, the total lithium content can be present in an amount of about 50 wt % to about 90 wt %, or in an amount of about 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %. In an aspect, the total lithium content can be present in an amount of about 50 wt % to about 85 wt %, or in an amount of about 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %. In an aspect, the total lithium content can be present in an amount of about 50 wt % to about 80 wt %, or in an amount of about 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %.

In an aspect, the anode compositions can utilize a greater proportion of the lithium in the discharge reaction than conventional lithium-containing anode compositions. For example, a conventional anode composition, e.g., comprising 44 wt % lithium, is typically discharged according to the following reaction:

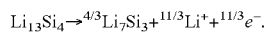

$$Li_{13}Si_4 \rightarrow {}^{4/3}Li_7Si_3 + {}^{11/3}Li^+ + {}^{11/3}e^-.$$

Thus, only about 64% of the lithium present in the lithium alloy is utilized in the discharge reaction. That is, although there is there is nominally 44 wt % lithium present in the lithium alloy, only 28.3 wt % is effectively used in the discharge reaction. In an aspect, the disclosed anode compositions utilize greater than 65% of the lithium present in the lithium alloy in the discharge reaction.

In an aspect, in situ-formed lithium alloy structures have a higher melting temperature (300-900° C.) to metallic lithium and to battery operating temepature (typically 350-550° C. Thus, in situ-formed lithium alloy structures do not melt during the batter operation. The formed internal network of nanometer and micrometer size structures, together with larger particles of the lithium alloying additive, can form intrinsic micro-, meso-, and macropores that provide capillary retention forces for molten lithium metal as well as for the molten salt electrolyte in the anode. Without wishing to be bound by a particular theory, it is believed that these structural properties allow for anodes comprising a high lithium metal content—up to 98 wt %—of the anode mass without substantial leakage of molten lithium during the anode operation. Upon formation of an in situ-formed lithium alloy nanostructure, the anode can harden, thereby enhancing the mechanical stability of the anode, while allowing the anode to remain ductile, which is in contrast to brittle conventional lithium silicon anodes. Disclosed anode compositions have improved ductile properties which allow for easier handling during production as well as for conformational design and configuration of anodes and thermal batteries. In an aspect, at the end of discharge process, the in situ-formed lithium alloy can be electrochemically delithiated and additionally contribute to overall discharge capacity of the anode.

Without wishing to be bound by a particular theory, it is thought that the process of in situ alloying begins upon compression of the metallic lithium, the lithium alloy, and the lithium alloying additive. It is believed that upon contact of the metallic lithium with the lithium alloy and lithium alloying additive that the in situ alloying process self-starts. Kinetics of the in situ alloying process can be thermally controlled with elevated or reduced temperature to accelerate or decelerate the process, respectively. Without wishing to be bound by a particular theory, for example, compression of a stabilized lithium particle, e.g., SLMP® lithium particles, provides the physical contact with lithium metal that begins the in situ alloying process. Upon physical compression of the anode composition powder, e.g., making an anode palette, the protective coating, e.g., lithium carbonate, on the SLMP® particles breaks and metallic lithium is exposed to the materials in the anode. The displaced metallic lithium during the in situ alloying process of the alloying lithium additive and lithium alloy, may form pores and channels that can be flooded with molten electrolyte upon the battery activation and thus increases the electrode to electrolyte interfacial area, which in turns increases discharge power density. During discharge, displaced lithium metal from the anode forms pores and channels that can be flooded with molten electrolyte and thus increases the electrode to electrolyte interfacial area, which in turns increases discharge power density.

Figure 2:
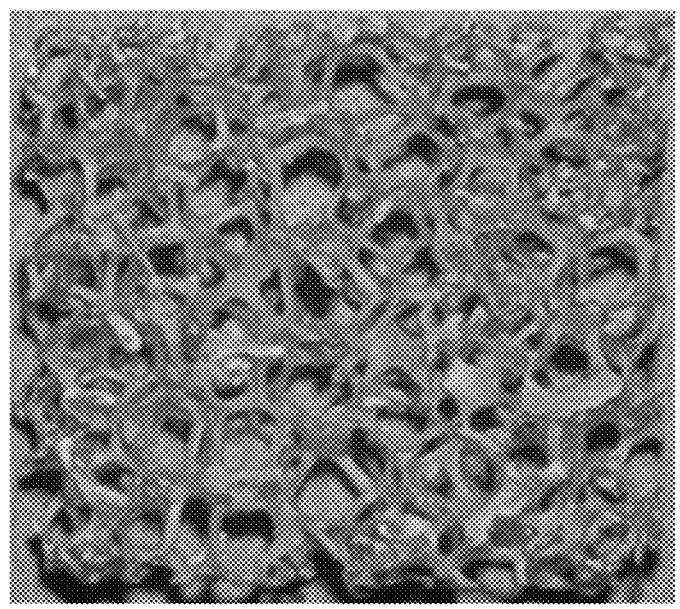
FIG. 2 shows a representative photograph of a metal foam that can be loaded with a disclosed nanostructure composite.
Figure 3:
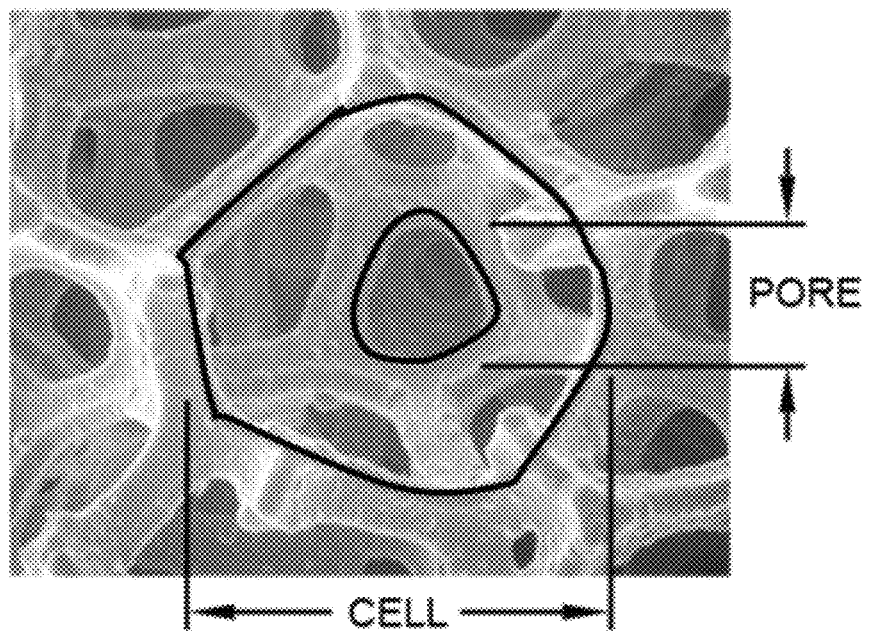
FIG. 3 shows a representative photograph of a disclosed metal foam with cell and pore indicated with manner in which size of each is determined.

In an aspect, the disclosed anode compositions can be loaded into a metal foam current collector. See FIG. 2 and FIG. 3 for exemplary metal foams. A metal foam current collector loaded with the anode composite powder can be compacted by mechanical calendaring to form an anode palette. The metal foam-anode composition structure can have increased anode palette mechanical stability and hardness, density, improved electronic conductivity, and improved ionic conductivity in an anode, such as an anode palette. The compressed open pores in the metal foam can increase retention of molten lithium and molten electrolyte in the anode by capillary forces. Exemplary metal foams that can be used with the disclosed anode compositions are metal foams including, but not limited to, nickel, copper, aluminum, steel, and titanium. Alternatively, disclosed anode compositions can be used with non-metal carbon foam to form anodes.

In an aspect, the disclosed anode compositions comprise a lithiated phase of Li—Si alloy (e.g., $Li_{22}Si_5$) that can be self-formed by then situ alloying process, which may be referred to as a lithiation process, between metallic lithium and $Li_{13}Si_4$ or Si particles. Without wishing to be bound by a particular theory, the presence of this in situ-formed lithium alloy (lithiated phase)can provide for improved charge and energy content of the anode. For example, as described herein below, described herein, a disclosed anode composition increased Li content in the Li—Si alloy from 44 wt % to 52.1 wt %, improved its ionic and electronic conductivity, and increased cell voltage by almost 187 mV compared to a conventional $Li_{13}Si_4$ anode. In an aspect, disclosed anode compositions provide an extremely high total lithium content, which provides increased charge density, electronic and ionic conductivity, and increased cell (battery) voltage compared to the conventional $Li_{13}Si_4$ anode, and thus increases specific discharge capacity, energy, and power capability of anodes made from disclosed compositions and batteries containing such anodes. In an aspect, the disclosed anode compositions utilize a greater proportion of the lithium in the anode for the discharge reaction compared to conventional lithium containing anodes. In an aspect, the disclosed anode compositions provide increased retention of metallic lithium in the anode.

Without wishing to be bound by a particular theory, it is believed that void pores formed in the disclosed anode compositions during discharge by displacement of metallic lithium can be filled with molten electrolyte. For example, in a battery such as that in FIG. 9, the molten electrolyte can be wicked from the electrolyte palette by capillary threes. Thus anodes made with disclosed compositions may have a high interfacial area between the anode and the electrolyte, which also supports high discharge power density during the entire course of discharge.

In an aspect, the invention relates to an anode composition comprising a metallic lithium; a lithium alloy; wherein the lithium alloy is Li—Si, Li—Al, Li—Ti, Li—V, Li—C, $LiFePO_4$; or Li—C; and wherein the lithium alloy is present in an amount of about 1 wt % to about 99 wt %; and a lithium alloying additive; wherein the lithium alloying additive is tin, aluminum, silicon, titanium, or vanadium wherein the lithium alloying additive has a particle size of about 1 nm to about 500 μm; and wherein the lithium alloying additive is present in an amount of about 0 wt % to about 80 wt %; wherein the total lithium content present is in an amount of about 1 to about 99 wt %; and provided that the total wt % of the components does not exceed 100 wt %.

In an aspect, the disclosure relates to electrolyte compositions comprising one or more halide salts of alkali metals may comprise salts including, hut not limited to, LiBr—KBr—LiF (m.p. 313° C.); (m.p. 321° C.); or LiCl—LiBr—LiF (m.p. 430° C.). Electrolyte compostions may optionally further comprise a high surface area binder material such as MgO, CaO, $SiO_2$, $Al_2O_3$, $TiO_2$, $ZrO_2$, $ZrSiO_4$, ceramic fibers, kaolin clay, fumed silica, fumed titania, alumina, an inert oxide, e.g., $Y_2O_3$ or $ZrO_2$, or combinations thereof to maintain a viscosity sufficient to limit flow of the salt mixture after it melts. In an aspect, an electrolyte composition comprising one or more halide salts of alkali metals comprises one or more lithium halides. The thermal stability order of lithium halides is LiF>LiCl>LiBr>LiI. However, molten salt electrolyte containing LiBr or LiI cannot be used for a high voltage (>3.5 V) thermal battery operating at 500° C. Compositions comprising LiF can be used at any temperature range, such as above 400° C. or above 500° C. In some aspects, molten salt containing chlorine ion (e.g., LiCl) may not be desirable as it decomposes at 3.5 V.

In an aspect, the disclosure relates to electrolyte compositions comprising LiCl, 20-30% wt %; LiBr, 60-70 wt %; or LiF, 5-15 wt %, and optionally a high surface area binder material such as MgO, CaO, $SiO_2$, $Al_2O_3$, $TiO_2$, $ZrO_2$, $ZrSiO_4$, ceramic fibers, kaolin clay, fumed silica, fumed titanic, alumina, an inert oxide, e.g., $Y_2O_3$ or $ZrO_2$, or combinations thereof In an aspect, an electrolyte composition comprises LiCl, 22 wt %; LiBr, 68.4 wt %; and LiF, 9.6 wt % and has a melting point of 465° C., and optionally a high surface area binder material such as MgO, CaO, $SiO_2$, $Al_2O_3$, $TiO_2$, $ZrO_2$, $ZrSiO_4$, ceramic fibers, kaolin clay, fumed silica, fumed titanic, alumina, an inert oxide, e.g., $Y_2O_3$ or $ZrO_2$, or combinations thereof. In an aspect, an electrolyte composition comprises a eutectic mixture of 45% by weight lithium chloride (LiCl) and 55% by weight potassium chloride (KCl) having a melting point of 352° C. mixed with a high surface area binder material such as magnesium oxide (MgO), (calcium oxide CaO), (or aluminum oxide ($Al_2O_3$).

In an aspect, a binder material in the electrolyte composition has a particle size of of about 1 μm to about 100 μm. In an aspect, a binder material in the electrolyte composition has a particle size of of about 0.5 μm to about 10 μm. In an aspect, a binder material in the electrolyte composition has a particle size of of about 0.5 μm to about 5 μm. In an aspect, a binder material in the electrolyte composition has a particle size of of about 0.5 μm, 1 μm, 1.5 μm, 2 μm, 2.5 μm, 3 μm, 3.5 μm, 4 μm, 4.5 μm, or 5 μm. In an aspect, a binder material in the electrolyte composition has particles that are nanoparticles. In an aspect, a binder material in the electrolyte composition has a particle size of about 1 nm to about 1000 nm.

In an aspect, an electrolyte composition comprises a binder material present in an amount of about 10 wt % to about 60 wt % and the balance is a salt mixture as described. herein that is solid at low temperatures (<350° C.) and molten at high temperatures (>350° C.). In an aspect, an electrolyte composition comprises a binder material present in an amount of about 20 wt % to about 50 wt % and the balance is a salt mixture as described herein that is solid at low temperatures (<350° C.) and molten at high temperatures (>350° C.). In an aspect, an electrolyte composition comprises a hinder material present in an amount of about 30 wt % to about 50 wt % and the balance is a salt mixture as described herein that is solid at low temperatures (<350° C.) and molten at high temperatures (>350° C.).

In an aspect, an electrolyte composition that is solid and/or stable at low temperatures and molten at high temperatures comprises at least one lithium halide salt, and at least one lithium non-halide salt, wherein the electrolyte includes a salt that has a melting point and can be molten above 350° C. In an aspect, a lithium halide salt can include a halide selected from F and Cl. In an aspect, a lithium non-halide salt can include a salt selected from the croup consisting of $LiVO_3$, $Li_2SO_4$, $LiNO_3$, and $Li_2MoO_4$. In an aspect, the salt has a melting point between 350° C. and 600°

C., wherein the lithium halide salt includes LiF or LiCl, and the lithium non-halide salt includes at least one salt selected from the group consisting, of $LiVO_3$, $Li_2SO_4$, $LiNO_3$, and $Li_2MoO_4$. In an aspect, the salt includes a first lithium halide salt and a second lithium halide salt, such as LiF and LiCl as lithium halide salts together. In an aspect, the lithium non-halide salt includes $LiVO_3$. In an aspect, the lithium non-halide salt includes $Li_2MoO_4$. In an aspect, the lithium non-halide salt includes $Li_2SO_4$. In an aspect, the lithium non-halide salt includes $LiNO_3$. In an aspect, the electrolyte can include only lithium as a positive ion. In an aspect, the electrolyte is at a temperature of between 350° C. and 600° C. and is molten. In an aspect, the amount of halide anion relative to a total amount of negative ions is at least about 20 mol %. In an aspect, the first lithium halide salt and second lithium halide salt have a ratio of from about 0.1 to about 1.0. In an aspect, the total lithium halide salt and total lithium non-halide salt has a ratio of from about 0.2 to about 2.0. In an aspect, the lithium halide salt being devoid of I or Br.

In an aspect, the disclosure relates to cathode compositions composition. In an aspect, a disclosed cathode composition comprises carbon-coated metal fluoride. In an aspect, the carbon-coated metal fluoride is $FeF_2$, $FeF_3$, $CuF_2$, $BiF_3$, $CoF_2$, or $CoF_3$, or combinations thereof. In an aspect, the carbon-coated metal fluoride is $FeF_3$.

In an aspect, a carbon-coated metal fluoride comprises a carbon material coating or deposited on a metal fluoride particle. The carbon coating of the metal fluoride can be carried out using carbon vapor deposition methods or high energy ball milling. The carbon-coated metal fluoride can be mixed with a binder as discussed herein below.

In an aspect, disclosed cathode compositions can be deposited into a metal foam current collector. In an aspect, following deposition in the metal foam current collector, an electrode, i.e., the metal foam current collector with deposited cathode composition, can be partially or fully thermally carbonized. In an aspect, the electrode can be soaked with molten salt electrolyte and vacuum infiltrated to infill pores within the carbon material, then cooled to solidity the molten salt electrolyte. In an aspect, a cathode can be mechanically calendared for high electronic and ionic conductivity, and for increased gravimetric and volumetric energy and power density.

In an aspect, a disclosed cathode composition can comprise a. hinder for molten electrolyte retention. In an aspect, the binder for molten electrolyte retention includes, but is not limited to, MgO, CaO, $SiO_2$, $Al_2O_3$, $TiO_2$, $ZrO_2$, $ZrSiO_4$, ceramic fibers, kaolin clay, fumed silica, fumed titanic, alumina, an inert oxide, e.g., $Y_2O_3$ or $ZrO_2$, or combinations thereof. In an aspect, a binder for molten electrolyte retention has a particle size range from about 1 nm to about 500 µm. In an aspect, a binder for molten electrolyte retention is present in an amount from about 1 wt % to about 25 wt %. In an aspect, a binder for molten electrolyte retention is present in an amount from about 1 wt % to about 20 wt %. In an aspect, a binder for molten electrolyte retention is present in an amount from about 1 wt % to about 15 wt %. In an aspect, a binder for molten electrolyte retention is present in an amount from about 1 wt % to about 10 wt %. In an aspect, a binder for molten electrolyte retention is present in an amount from about 1 wt % to about 5 wt %. In an aspect, a binder for molten electrolyte retention is present in an amount of about 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt %. In an aspect, a disclosed cathode composition can comprise one or more additional cathode additives. In an aspect, the additional cathode additive is, but is not limited to, a carbon material, nickel, copper, iron, or aluminum. In an aspect, the nickel, copper, iron, or aluminum is in the form of a flake with a thickness from about 1 nm to about 20 µm. In an aspect, the carbon material is carbon black, activated carbon, carbon nanoparticles, carbon nanotubes, graphene, graphite, or combinations thereof. In an aspect, the graphite is exfoliated graphite, e.g., exfoliated graphite nano-platelets (xGnP); a natural graphite, e.g., alpha graphite or beta graphite; or a synthetic graphite. In an aspect, the additional cathode additive is present in an amount from about 1 wt % to about 25 wt %. In an aspect, the additional cathode additive is present in an amount, from about 5 wt % to about 25 wt %. In an aspect, the additional cathode additive is present in an amount from about 10 wt % to about 25 wt %. In an aspect, the additional cathode additive is present in an amount from about 5 wt % to about 15 wt %. In an aspect, the additional cathode additive is present in an amount of about 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt %.

In an aspect, a carbon-coated metal fluoride is prepared by carbon vapor deposition methods. For example, metal fluoride particles can be used without further processing, or alternatively can be high energy balled milled before use. In an aspect, the metal fluoride particle size is from about 1 µm to about 100 µm. Alternatively, the metal fluoride particle size is from about 1 nm to about 1000 nm. In an aspect, the metal fluoride is loaded into an appropriate container, e.g., an alumina boat, and placed in a tube furnace. The furnace is purged with an inert gas, e.g., argon, at room temperature for about 15 minutes to about 60 minutes, and then the furnace is heated to about 150° C. to about 300° C. over a period of about 15 minutes to about 60 minutes, and then maintained at temperature for an additional period of about 15 minutes to about 60 minutes to ensure that the material is dry. The furnace temperature is then ramped to about 350° C. to about 600° C. over a period of about 15 minutes to about 60 minutes, and then maintained at temperature for about 15 minutes to about 60 minutes to ensure stable temperature distribution across the powder. The inert gas flow is stopped and acetylene is flowed into the furnace for about 1 minute to about 30 minutes to coat the metal fluoride particles with carbon. The acetylene gas flow is stopped and the furnace purged with an inert gas, e.g., argon. As the furnace is purged, the furnace temperature is maintained at about 350° C. to about 600° C. for about 15 minutes to about 60 minutes. Furnace heating is then stopped and the carbon-coated metal fluoride allowed to cool to ambient temperature.

In an aspect, the carbon-coated $FeF_3$ is prepared by carbon vapor deposition methods. For example, $FeF_3$ particles can be used without further processing, or alternatively can be high energy balled milled before use. In an aspect, the $FeF_3$ particle size is from about 1 µm to about 100 µm. Alternatively, the $FeF_3$ particle size is from about 1 nm to about 1000 nm. In an aspect, the metal fluoride is loaded into an appropriate container, e.g., an alumina boat, and placed in a tube furnace. The furnace is purged with an inert gas, e.g., argon, at room temperature for about 15 minutes to about 60 minutes, and then the furnace is heated to about 150° C. to about 300° C. over a period of about 15 minutes to about 60 minutes, and then maintained at temperature for an additional period of about 15 minutes to about 60 minutes to ensure that the material is dry. The furnace temperature is then ramped to about 350° C. to about 600° C. over a period of about 15 minutes to about 60 minutes, and then maintained at temperature for about 15 minutes to about 60 minutes to ensure stable temperature distribution across the powder. The inert gas flow is stopped. and acetylene is flowed into the furnace for about 1 minute to about 30 minutes to coat the FeF$_3$ particles with carbon. The acetylene gas flow is stopped and the furnace purged with an inert gas, e.g., argon. As the furnace is purged, the furnace temperature is maintained at about 350° C. to about 600° C. for about 15 minutes to about 60 minutes. Furnace heating is then stopped and the carbon-coated FeF$_3$ allowed to cool to ambient temperature.

In an aspect, the carbon-coated FeF$_3$ is prepared by carbon vapor deposition methods. For example, FeF$_3$ particles can be used without further processing, or alternatively can be high energy balled milled before use. In an aspect, the FeF$_3$ particle size is from about 1 µm to about 100 µm. The furnace is purged with argon at room temperature for about 30 minutes, and then the furnace is heated to about 150° C. over a period of about 30 minutes, and then maintained at temperature for an additional period of about 30 minutes to ensure that the material is dry. The furnace temperature is then ramped to about 400° C. over a period of about 30 minutes, and then maintained at temperature for about 30 minutes to ensure stable temperature distribution across the powder. The argon flow is stopped and acetylene is flowed into the furnace for about 10 minutes to carbon coat the FeF$_3$ particles. The acetylene gas flow is stopped and the furnace purged with an inert gas, e.g., argon. As the furnace is purged, the furnace temperature is maintained at about 400° C. for about 30 minutes. Furnace heating is then stopped and the carbon-coated FeF$_3$ allowed to cool to ambient temperature.

In an aspect, the metal fluoride particles can be carbon-coated by high energy ball milling of the metal fluoride particles with a carbon material. In an aspect, the metal fluoride particles can be carbon-coated by high energy ball milling of the metal fluoride particles with carbon black, activated carbon, carbon nanoparticles, carbon nanotubes, graphene, graphite, or combinations thereof.

In an aspect, the FeF$_3$ particles can be carbon-coated by high energy ball milling of the metal fluoride particles with a carbon material. In an aspect, the FeF$_3$ particles can be carbon-coated by high energy ball milling of the metal fluoride particles with carbon black, activated carbon, carbon nanoparticles, carbon nanotubes, graphene, graphite, or combinations thereof.

In an aspect, prior to use in fabrication of a cathode, the carbon-coated metal fluoride particles can be further dried as necessary. In an aspect, the carbon-coated metal fluoride particles can be further processed by be oxygen plasma treated or ozone treated. The further processing can be used to increase hydrophilic; interactions with the molten electrolyte and for improved electrolyte capillary retention in the cathode.

Figure 4:
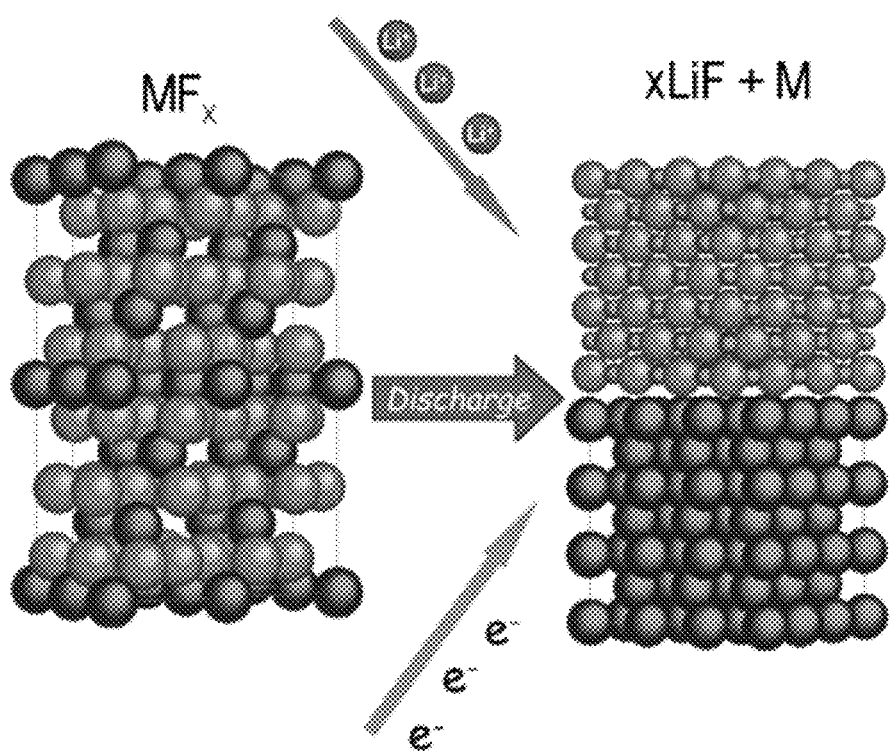
FIG. 4 shows a schematic representation of a conversion reaction that can occur during discharge a disclosed metal fluoride cathode, with representative crystallographic changes shown therein.

In an aspect, and without wishing to be bound by a particular theory, it is believed that a disclosed cathode composition undergoes a reversible conversion reaction accompanied by crystallographic changes during discharge and potentially during charge of a metal fluoride cathode. It is believed that the reversible reaction that occurs is can be the one shown in FIG. 4. As shown in FIG. 4, during Li insertion, a displacement/conversion process takes place wherein Li displaces metals leading to the formation of LiF and metal clusters of about 1-20 nm. The theoretical Li+ capacity of fluorides is determined by the stoichiometry and the density of the fluoride-forming metal according to:

$$x\text{Li}^+ + xe^- + \text{MF}_x \rightarrow x\text{LiF} + \text{M}$$

where M is a fluoride-forming metal.

Figures 5A, 5B, 5C:
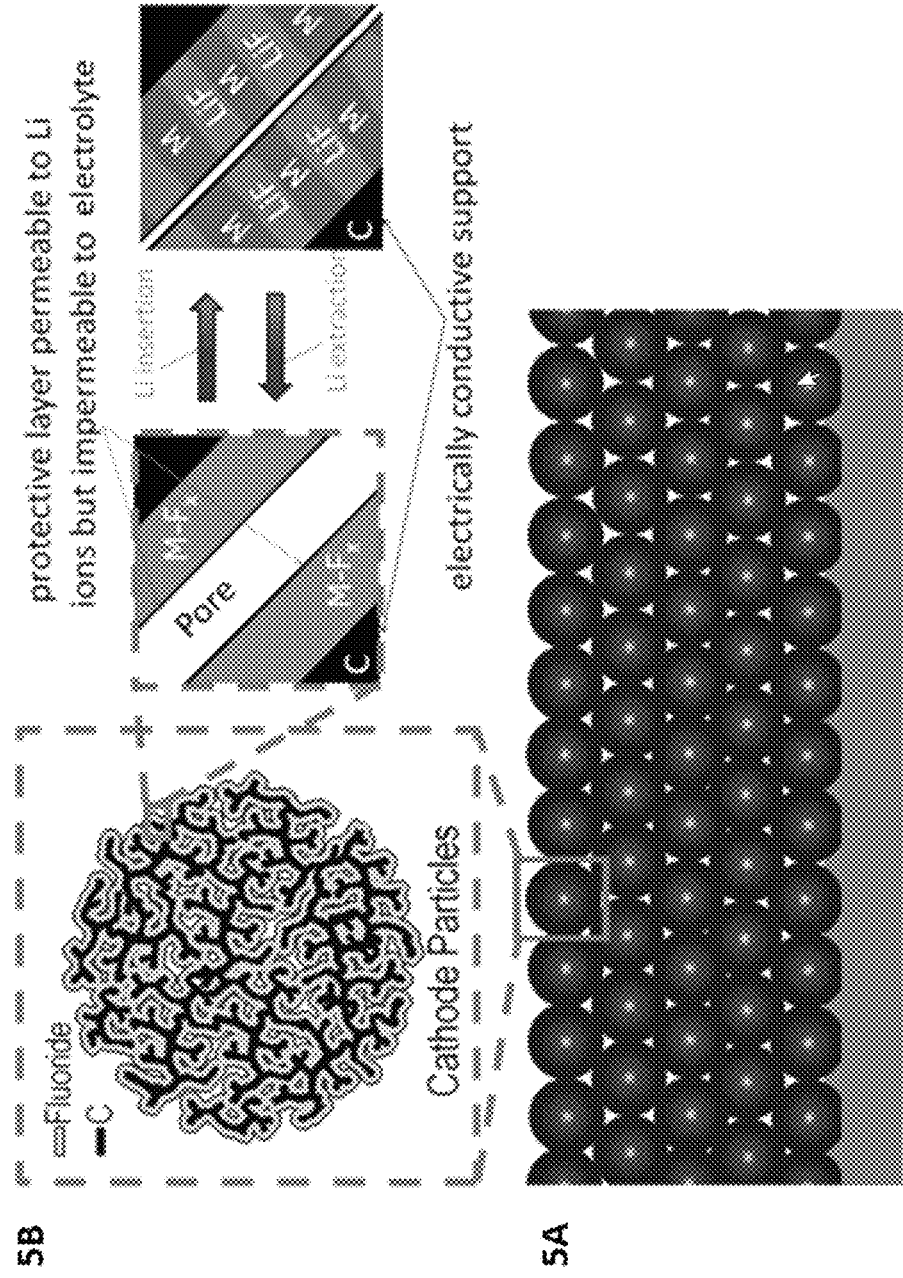
FIGS. 5A-5C show a schematic representation of a disclosed high capacity metal fluoride cathode formulation.

In an aspect, and without wishing to be bound by a particular theory, a possible architecture for disclosed. cathode compositions is shown in FIG. 5. The figure shows that the carbon matrix provides conductive paths for electrons, while pores within carbon increase the electrode-molten electrolyte interface area and improve access of electrolyte, and provide space for volume changes during Li+ ion insertion.

In an aspect, the disclosure relates to methods of making the disclosed compositions, methods of making anodes, and methods of making cathodes.

In an aspect, the disclosure relates to methods of making an anode, e.g., an anode palette, the method comprising mixing a metallic lithium, a lithium alloy, and a lithium alloying additive until a homogeneous mixture is obtained; placing the homogeneous mixture into a pressure die; applying a pressure of about 400 MPa to about 700 MPa to the pressure die; thereby forming an anode, e.g., an anode palette.

In an aspect, the disclosure relates to methods of making an anode comprising mixing the components of a disclosed anode composition until a homogeneous mixture is obtained; placing the homogeneous mixture into a pressure die; applying a pressure of about 400 MPa to about 700 MPa to the pressure die; thereyby forming an anode palette.

In an aspect, the disclosure relates to methods of making an anode comprising mixing a metallic lithium, a lithium alloy, and a lithium alloying additive until a homogeneous mixture is obtained; placing the homogeneous mixture into a pressure die; applying a pressure of about 400 MPa to about 700 MPa to the pressure die; thereyby farming an anode palette.

In an aspect, the disclosure relates to methods of making an anode comprising mixing a metallic lithium, a lithium alloy, and a lithium alloying additive until a homogeneous mixture is obtained; wherein the lithium alloy is Li—Si; Li—Al, Li—Ti; Li—V, Li—C, LiCoO$_2$, LiMnO$_4$, LiFePO$_4$; or Li—C; wherein the lithium alloying additive is Sn, Si, Al, Ti, V, Mg, Mn, Ge, C, S, Sb, Zn, Ge, CoO$_2$, NiO$_2$, MgO$_2$, FePO$_4$, MnPO$_4$, CoPO$_4$, NiPO$_4$, and layered oxides such as [Ni$_{1/3}$Mn$_{1/3}$Co$_{1/3}$]O$_2$, [Li$_{0.2}$Mn$_{0.6}$Ni$_{0.2}$]O$_2$, [Ni$_{0.7}$Mn$_{0.15}$CO$_{0.15}$]O$_2$; placing the homogeneous mixture into a pressure applying a pressure of about 400 MPa to about 700 MPa to the pressure die; thereyby forming an anode palette.

In an aspect, pressure used is about 400 MPa, about 450 MPa, about 500 MPa, about 550 MPa, about 600 MPa, about 650 MPa, or about 700 MPa. In an aspect, the pressure used is about 520 MPa to about 560 MPa. In an aspect, the pressure used is about 500 MPa, about 510 MPa, about 520 MPa, about 530 MPa, about 540 MPa, about 550 MPa, about 560 MPa, about 570 MPa, about 580 MPa, about 590 MPa, or about 600 MPa.

In an aspect, components of the disclosed anode compositions can be mixed by various mixing techniques known to one skilled in the art, including dry and wet (slurry) methods. Exemplary dry mixing methods include manual hand mixing, dry powder mixer/shaker, resonant acoustic mixer (REM), blade and no-blade planetary centrifugal mixer, and ball mixer. Alternatively, a slurry of the anode composite can be prepared with a dry solvent and mixed with a slurry mixing method. Exemplary slurry mixing methods include manual hand mixing, blade slurry mixer, resonant acoustic mixer (REM), blade and no-blade planetary centrifugal mixer, and ultrasonic mixer. Exemplary solvents that can be used in a slurry mixing method include dry organic solvents such as dimethyl carbonate, diethyl carbonate, and propylene carbonate. In a slurry mixing method, the solvent can be evaporated before, during, or after the anode palette pressproduction.

In an aspect, the disclosure relates to methods of making carbon-coated metal fluoride particles, comprising coating metal fluoride particles with a carbon material by carbon vapor deposition. The carbon vapor deposition can be carried out conditions optimal as determined by the skilled artisan. For example, the carbon vapor deposition can be carried out by heading comprises healing the metal fluoride particles in the presence of acetylene at a temperature of about 350° C. to about 500° C. In an aspect, the carbon vapor deposition can be carried out by heading comprises heating the metal fluoride particles in the presence of acetylene at a temperature of about 350° C., about 360° C., about 370° C., about 380° C., about 390° C., about 400° C., about 410° C., about 420° C., about 430° C., about 440° C., about 450° C., about 460° C., about 470° C., about 480° C., about 490° C., or about 500° C. The metal fluoride can be any disclosed metal fluoride useful in the preparation of a cathode composition, i.e., $FeF_2$, $FeF_3$, $CuF_2$, $BiF_3$, $BiF_5$, $CoF_2$, $CoF_3$, or combinations thereof.

In an aspect, disclosed herein are methods of providing electricity, comprising providing an article comprising an anode, a cathode, and an electrolyte; wherein the anode comprises a disclosed improved anode composition; wherein the electrolyte composition is at a temperature so as to be a molten electrolyte; and discharging thermal battery to provide electricity.

In an aspect, disclosed herein are methods of providing electricity, comprising providing an article comprising an anode, a cathode, and an electrolyte, wherein the cathode comprises a disclosed improved cathode composition; wherein the electrolyte composition is at a temperature so as to be a molten electrolyte; and discharging thermal battery to provide electricity.

In an aspect, disclosed herein are methods of providing electricity, comprising providing an article comprising an anode, a cathode, and an electrolyte; wherein the anode comprises a disclosed improved anode composition; wherein the cathode comprises a disclosed improved cathode composition; wherein the electrolyte composition is at a temperature so as to be a molten electrolyte; and discharging thermal battery to provide electricity.

In an aspect, the disclosure relates to various articles comprising the disclosed anode and cathode compositions. For example, the article can be an anode comprising the disclosed anode compositions or a cathode comprising the disclosed cathode composition. Alternatively, the article can comprise both an anode comprising the disclosed anode compositions and a cathode comprising the disclosed cathode composition. In an aspect, the article is a battery comprising an anode comprising the disclosed anode compositions cathode, a cathode comprising the disclosed cathode composition, or comprising both an anode comprising the disclosed anode compositions and a cathode comprising the disclosed cathode composition. In an aspect, the article is a thermal battery. In an aspect, the article can be an article with a military application such as missiles, torpedoes, bombs, dispersed munitions, fuses, space missions and for emergency-power situations such as those in aircraft or submarines. The disclosed articles need not be restricted to military use, for example, the disclosed articles include an emergency power system in a civilian aircraft, train, or another transportation vehicle. Disclosed articles include those used in a medical setting, e.g., an external defibrillator, comprising a disclosed anode composition, cathode composition, anode, cathode, battery, or thermal battery. Disclosed articles include electrochemical devices comprising a disclosed anode composition, cathode composition, anode, cathode, battery, or thermal battery.

In an aspect, the disclosure relates to articles such as anodes comprising a. disclosed anode composition. In an aspect, the disclosed anodes have improved ductility and malleability, that is, the disclosed anode compositions are soft and pliable compared to conventional anode compositions. Thus, the disclosed anode compositions provide for the ability to produce very thin anodes. In an aspect, the disclosed anodes can have a thickness of about 5.0 mm, about 2.5 mm, 2.0 mm, 1.0 mm, 0.5 mm, 0.1 mm and 0.01 mm. In an aspect, the disclosed anodes are mechanically stable and easy to handle in the production process compared to conventional anodes comprising $Li_{13}Si_4$ that are very brittle. In an aspect, the disclosed anodes are pliable and allows and can can be formed in various shapes such as rings, conical shapes, or other shape forms. In contrast, conventional anodes comprising $Li_{13}Si_4$ are typically restricted to an anode disk or palette shape or form. The disclosed anode allows for conformal and flexible applications.

In an aspect, the disclosure relates to articles such as cathodes comprising a disclosed cathode composition. In an aspect, the disclosed cathodes can have a thickness of about 5.0 mm, about 2.5 mm, 2.0 mm, 1.0 mm, 0.5 mm, 0.1 mm, and 0.01 mm.

In an aspect, the disclosure relates to articles such as thermal batteries, with improved characteristics comprising disclosed anode compositions, a conventional electrolyte composition, and a conventional cathode composition.

In an aspect, the disclosure relates to articles such as thermal batteries, with improved characteristics comprising a conventional anode composition, a conventional electrolyte composition, and a disclosed cathode composition.

In an aspect, the disclosure relates to articles such as thermal batteries, with improved characteristics comprising a disclosed anode composition, a disclosed electrolyte composition, and a disclosed cathode composition.

Disclosed thermal batteries can be configured with the cathode, anode, and/or electrolyte compositions to be storage stable without degrading the electrical power potential. For example, thermal batteries can be configured with the cathode, anode, and/or electrolyte composition capable of being storage stable for up to 25 years or more over a wide range of storage temperatures (−55° C. to 75° C. ) without degradation. Thermal batteries are hermetically sealed so that the cathode, anode, and/or electrolyte compositions are not exposed to external moisture in order to inhibit degradation of the battery.

In an aspect, the disclosed cathode compositions can be used in a battery with either the disclosed anode compositions or a conventional anode composition as known to one skilled in the art.

In an aspect, the disclosed anode compositions can be used in a battery with either the disclosed improved cathode compositions or a conventional cathode composition as known to one skilled in the art.

In an aspect, a conventional anode composition can comprise a lithium alloy, such as a lithium-silicon, a lithium-aluminum alloy, or alteratively an aluminum amalgam, a zinc amalgam, zinc, or magnesium. In an aspect, the lithium alloy in the conventional anode composition is lithium silicon. In an aspect, the conventional anode composition can further comprise 10%-50% electrolyte material.

In an aspect, a conventional cathode composition can comprise $FeS_2$, $CoS_2$, $CuCl_2$, CuS, $CuCrO_4$, $Ag_2S$, $Ag_2CrO_4$, S, Cr (V) compounds for example $Ca_2Cr_4Cl$, $Ca_5(Cr_4)_3OH$, $Ca_3(Cr_4)_2$, $Cr_2O_5$ and others, AgCl, AgF, AgBr, $FeS_2$, $TiS_2$, $Ag_2MoO_4$, $Ag_2WO_4$, $Ag_2O$, $AgIO_3$, $AgIO_4$ and $(NH_4)_2Ce(NO_3)_6$. In an aspect, the conventional cathode composition comprises $FeS_2$. In an aspect, the conventional cathod composition comprises $FeS_2$. In an aspect, the conventional cathode composition can further comprise a carbon material, such as activated carbon, graphite, graphene, carbon nanotubes (CNT), combinations thereof. In an aspect, the conventional cathode composition can further comprise a binder such as MgO. In an aspect, the conventional cathode composition can include a metal fluoride selected from one or more of $FeF_3$, or $VF_3$, or $CrF_3$, or $MnF_3$, or $CoF_3$, or a mixture thereof, or any alone or in any combination.

In an aspect, the conventional cathode composition can comprise $FeF_3$ or a hybrid material of $FeF_3/FeS_2$, $CoF_3/CoS_2$, and/or $CoF_3/FeS_2$. In an aspect, the cathode can have about 0% to about 25% CNT and from about 75% to about 100% $FeF_3$ or $FeF_3/FeS_2$, $CoF_3/CoS_2$ and/or $CoF_3/FeS_2$ or other material such as a hybrid material, or any percentage within the percentage range. In an aspect, the cathode can have about 5% CNT and about 95% $FeF_3$ or other material such as a hybrid material.

In an aspect, disclosed thermal batteries can comprise at least one electrochemical cell including an anode, a cathode, and an electrolyte disposed between the anode and the cathode, wherein the electrolyte is a disclosed electrolyte composition including the molten salt in accordance with the disclosure herein. In an aspect, at least one of the anode and the cathode further includes the molten salt.

In an aspect, disclosed. thermal batteries can comprise an electrolyte composition. In an aspect, an electrolyte composition that is in solid phase at low temperatures (<200° C.) and molten at high temperatures (>200° C.) can comprise one or more halide salts of alkali metals. In an aspect, an electrolyte composition that is in solid phase at low temperatures and molten at high temperatures can comprise: at least one lithium halide salt; and at least one lithium non-halide salt, wherein the electrolyte includes a salt that has a melting point and can be molten above 200° C.

In an aspect, disclosed thermal batteries can comprise cathode, anode, and/or electrolyte compositions configured to operate at temperatures between 200-700° C. so that the electrolyte composition becomes a molten salt electrolyte. As such, the thermal batteries can be inactive at room temperature and up to 100, 200, 300, 350, 450, 500, or to 550° C. as the salt electrolyte is in a solid state and bearing a low ionic conductivity to minimize self discharge and degradation processes. For example, disclosed cathode, anode, and/or electrolyte compositions provide a low conductivity phase at low temperatures for the electrolyte, which promote the capability for the battery to have a long shelf life with substantially no capacity fade, yet the battery can be activated rapidly, for example, within less than one second.

In an aspect, disclosed thermal batteries can comprise an initiator comprising an ignition system and heat generating material that provides enough heat in order to increase the temperature of the thermal battery to a temperature at or above the melting temperature of the electrolyte composition. For example, the ignition system can comprise one or more internal activatible pyrotechnic heat source that can be ignited on a timer or on demand and a heat palette that generate thermal energy sufficient to raise the battery internal temperature to at least the is temperature of the electrolyte, thereby causing a large increase in the electrolyte ionic conductivity in order to provide electricity. Thermal batteries can he configured to be active when the electrolyte is above the melting point (e.g., typically above 350-500° C.) and generate power as long as enough active mass is available for the charge transfer reaction or the battery cools down below the electrolyte melting temeprature.

In an aspect, disclosed thermal batteries can comprise an ignition system comprising a first and a second activable pyrotechnic heat source. The use of two separately activable pyrotechnic heat sources can allow for improved control of thermal battery activation. The second pyrotechnic heat source can be controlled via a sensor and activating device. The sensor can evaluate the ambient temperature of the battery at or near the core and optionally also outside the battery casing, and determine if the second heat source must be activated in addition to the first heat source to achieve an optimum operating temperature for the cell stack inside the battery casing. The second pyrotechnic heat source may have a. different composition with a higher activation temperature than the first heat source, so that it is not activated by the heat generated from the first pyrotechnic heat source or its activating device.

In an aspect, a thermal battery can include a stack from about 2 electrochemical cells to about 500 electrochemical cells. In an aspect, a thermal battery can include a stack from about 4 electrochemical cells to about 250 electrochemical cells. In an aspect, a thermal battery can include a stack from about 8 electrochemical cells to about 200 electrochemical cells. In an aspect, a thermal battery can include a stack from about 10 electrochemical cells to about 50 electrochemical cells. In an aspect, a thermal battery can include a stack of about 10 electrochemical cells, 11 electrochemical cells, 12 electrochemical cells, 13 electrochemical cells, 14 electrochemical cells, 15 electrochemical cells, 16 electrochemical cells, 17 electrochemical cells, 18 electrochemical cells, 19 electrochemical cells, 20 electrochemical cells, 21 electrochemical cells, 22 electrochemical cells, 23 electrochemical cells, 24 electrochemical cells, 25 electrochemical cells, 26 electrochemical cells, 27 electrochemical cells, 28 electrochemical cells, 29 electrochemical cells, 30 electrochemical cells, 31 electrochemical cells, 32 electrochemical cells, 33 electrochemical cells, 34 electrochemical cells, 35 electrochemical cells, 36 electrochemical cells, 37 electrochemical cells, 38 electrochemical cells, 39 electrochemical cells, 40 electrochemical cells, 41 electrochemical cells, 42 electrochemical cells, 43 electrochemical cells, 44 electrochemical cells, 45 electrochemical cells, 46 electrochemical cells, 47 electrochemical cells, 48 electrochemical cells, 49 electrochemical cells, or 50 electrochemical cells, or combinations thereof.

In an aspect, a thermal battery can include an anode having a thickness from about 0.01 mm to about 5 mm. In an aspect, a thermal battery can include an anode having a. thickness from about 0.01 mm to about 2 mm. In an aspect, a thermal battery can include an anode having a thickness from about 0.05 mm to about 1.5 mm. In an aspect, a thermal battery can include an anode having a thickness from about 0.1 mm to about 1.0 mm.

In an aspect, a thermal battery can include a cathode having a thickness from about 0.01 mm to about 5 mm. In an aspect, a thermal battery can include a cathode having a thickness from about 0.01 mm to about 2 mm. In an aspect, a thermal battery can include cathode having a thickness from about 0.05 mm to about 1.5 mm. In an aspect, a thermal battery can include a cathode having a thickness from about 0.1 mm to about 1.0 mm.

In an aspect, a thermal battery can include an electrolyte separator region thickness from about 0.01 mm to about 5 mm. In an aspect, a thermal battery can include an electrolyte separator region thickness from about 0.01 mm to about 2 mm. In an aspect, a thermal battery can include an electrolyte separator region thickness from about 0.05 mm to about 1.5 mm. In an aspect, a thermal battery can include an electrolyte separator region thickness from about 0.1 mm to about 1.0 mm.

Figure 9:
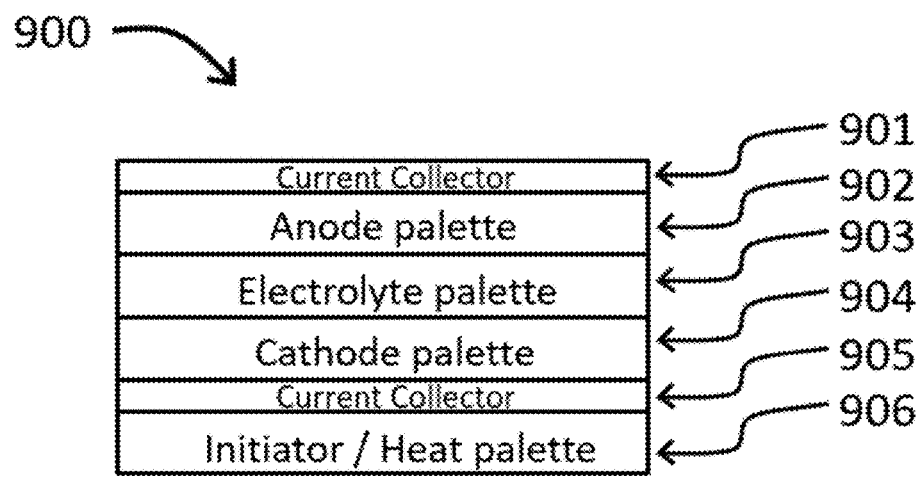
FIG. 9 shows a. representative schematic of a disclosed thermal battery.

An exemplary thermal battery is shown in FIG. 9. Thermal battery 900 components can be prepared by consolidating powders via a mechanical pressing operation to produce a palette, pellets, or wafers. Thermal batteries using pressed components can be prepared by assembling, in stacks, the various components, such as the anode 902, electrolyte-separator 903, and cathode 904, and, optionally, an initiator comprising a heat source pellet 906 if applicable to the particular battery design and application. In some applications, it may not be necessary to include a heat source. For example, for applications in which the battery is introduced into a high temperature environment, introduction into the environment will melt the electrolyte and activate the battery. Assembly of one each of anode 902, electrolyte-separator 903, and cathode 905 comprises a single electrochemical cell. Multiple cells may be stacked in series to produce a thermal battery. Current collectors 901 and 905 also may be included. In this regard it should be understood that thermal battery designs other than as shown in FIG. 9 may be used without departing from the scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and. deviations should be accounted for. Unless indicated otherwise, parts are parts by weight, temperature is in ° C. or is at ambient temperature, and pressure is at or near atmospheric.

Example 1

Preparation of a Disclosed Anode Palette: An anode palette was prepared from a disclosed anode composition comprising dry 75 wt % of SLMP® lithium powder (FMC Lithium, Charlotte, N.C.) was hand mixed with 8.5 wt % of Sn spherical nanoparticles of 60-80 nm diameter (99.99% purity; US Research Nanomaterials, Houston, Tex.) and 16.5 wt % of $Li_{13}Si_4$ alloy particle with a particle size of 2-5 µm. Following mixing to a generally homogeneous distribution, the mixture was loaded into an anode compression die, and the anode palette was pressed using a pressure of 542 MPa.

Preparation of a Conventional Anode Palette: A conventional anode palette was prepared from a conventional anode composition comprising 100 wt % $Li_{13}Si_4$ of particle size of 2-5 µm. The powder was loaded into anode palette compression die, and the anode palette pressed using a pressure of 542 MPa.

Preparation of an Electrolyte Palette: An electrolyte palette was prepared using an electrolyte salt mixture comprising LiCl, 22 wt %; LiBr, 68.4 wt %; and LiF, 9.6 wt %. The electrolyte salt mixture was mixed with MgO binder, 37 wt %, with particle size diameter 1 µm to form the electrolye composition used to form the electrolyte palette. The complete electrolyte salt mixture with MgO was loaded into an electrolyte compression die, and the electrolyte palette was pressed using a pressure of 344 MPa.

Preparation of Carbon-Coated $FeF_3$: Particles of $FeF_3$ were used as obtained from the chemical vendor, and they had a broad range of particle size of 1-10 µm. The material was loaded into an alumina boat and inserted into a tube furnace. The furnace was purged with argon at room temperature for 30 min, and then heated to 150° C. in 30 min. The tube furnace was maintained at 150° C. for 30 minutes. The temperature was then ramped to 400° C. over a period of 30 min, and then maintained at 400° C. for an additional 30 min to ensure stable temperature distribution across the powder. The argon flow was stopped and the acetylene was flowed into the tube furnace over a period of 10 min to carbon coat the $FeF_3$ particles. The acetylene gas flow was stopped and the tube furnace was purged with argon over a period of 30 min while the temperature was maintained at 400° C. The heating of the tube furnace was stopped, and the sample allowed to cool to ambient temperature.

Preparation of a Disclosed Cathode Palette: A cathode palette was prepared from a disclosed cathode composition comprising carbon coated $FeF_3$, 64.6 wt %; molten electrolyte salt mixture, 19.7 wt %; exfoliated graphite, 4 wt % (Superior Graphite ABG1010, 22 m²/g, pore size 0.12 cm³/g); and nickel flakes, 11.7 wt %. The electrolyte salt mixture comprised within the salt mixture LiCl, 22 wt %; LiBr, 68.4 wt %, and LiF, 9.6 wt %. The materials were hand mixed and then loaded into a cathode palette compression die, and cathode palette was pressed using a pressure of 1.161 GPa.

Preparation of a Conventional Cathode Palette: A conventional cathode palette was prepared from a conventional composition comprising $FeS_2$, 63 wt %; MgO with a particle size of 1 µm, 15.5 wt %; and electrolyte salt mixture, 13.5 wt %; and exfoliated graphite additive, 8 wt % (Superior Graphite ABG1010, 22 m²/g, pore size 0.12 cm³/g). The electrolyte salt mixture was as described above and comprised within the salt mixture LiCl, 22 wt %; LiBr, 68.4 wt %, and LiF, 9.6 wt %. The materials were hand mixed and then loaded into a cathode palette compression die, and cathode palette was pressed using a pressure of 1.161 GPa.

Example 2

Briefly, a disclosed anode test cell was prepared by placing an electrolyte palette between a disclosed anode palette comprising a disclosed anode composition and a. conventional cathode palette comprising a conventional cathode compostion ("disclosed anode test cell"). The palettes were prepared as described herein above. Once assembled, the cell was heated to an operating temperature of 465° C. and discharged with a constant current density of 70 mA·cm$^{-2}$ over the palette geometric surface area. Discharge occurred under a constant pressure of 35 kPa.

For comparison, a reference cell was prepared by placing an electrolyte palette between a conventional anode palette comprising a conventional anode composition and a. conventional cathode palette comprising a conventional cathode compostion ("reference cell"). The palettes were prepared as described herein above. Once assembled, the cell was heated to an operating temperature of 465° C. and discharged with a constant current density of 16 mA·cm$^{-2}$ over the palette geometric surface area. Discharge occurred under a constant pressure of 24 kPa.

Figure 6:
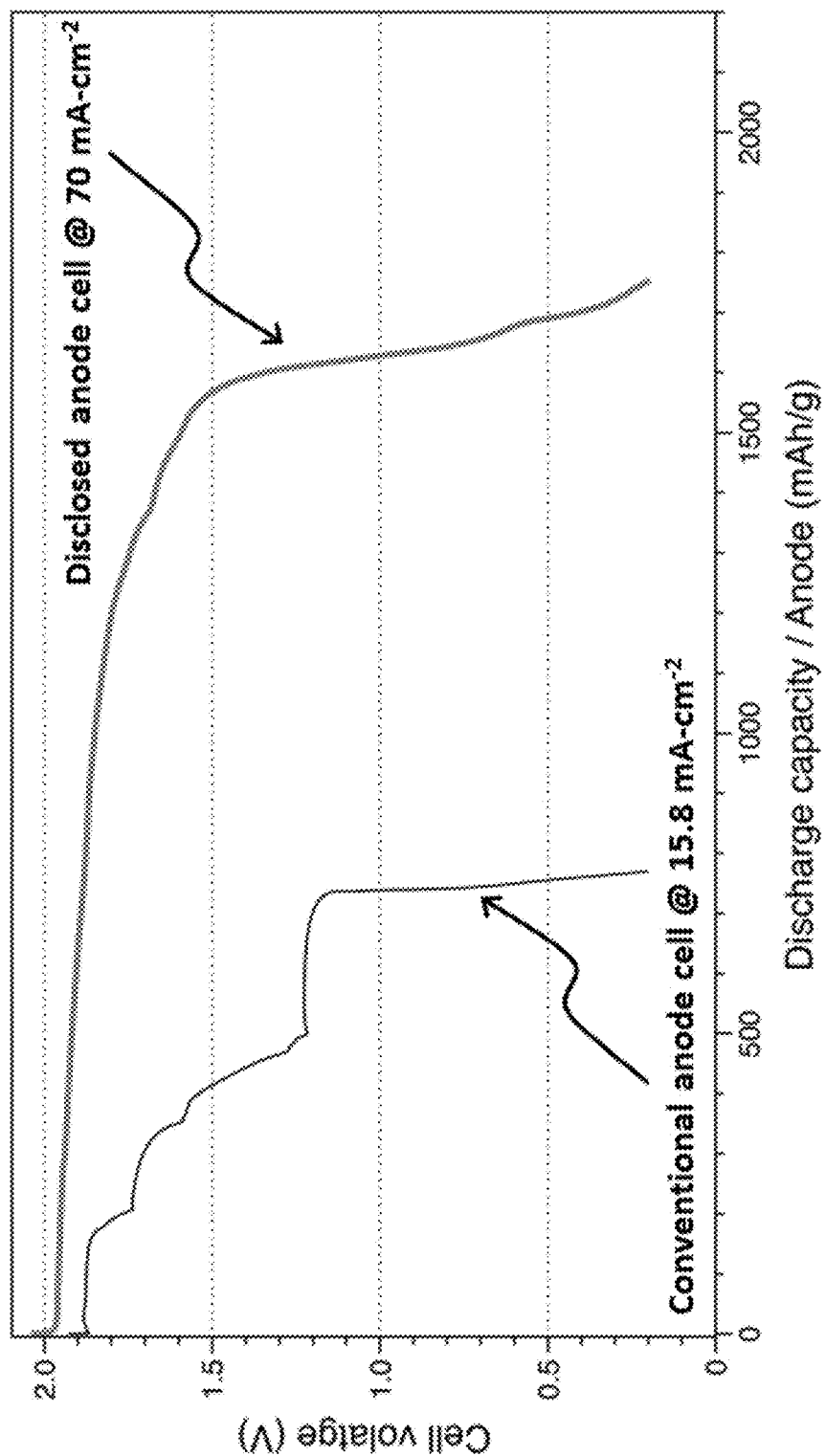
FIG. 6 shows a graph of representative discharge curve data comparing a cell comprising a disclosed anode with a conventional cathode to a cell comprising a conventional anode and cathode.

Data comparing the discharge curve for a disclosed anode test cell to the reference cell are shown in FIG. 6. The data show that at a cut-off voltage of 1V, the charge density of the disclosed anode test cell is increased by a facter greater than 2.2-fold.

Example 3

Briefly, a disclosed cathode test cell was prepared by placing an electrolyte palette between a conventional anode palette comprising a conventional anode composition and a disclosed cathode palette comprising a disclosed cathode compostion. The palettes were prepared as described herein above. Once assembled, the cell was heated to an operating temperature of 465° C. and discharged with a constant current density of 4 mA·cm$^{-2}$ over the palette geometric surface area. Discharge occurred under a constant pressure of 24 kPa.

For comparison, a reference cell was prepared by placing an electrolyte palette between a conventional anode palette comprising a conventional anode composition and a conventional cathode palette comprising a conventional cathode compostion ("reference cell"). The palettes were prepared as described herein above. Once assembled, the cell was heated to an operating temperature of 465° C. and discharged with a constant current density of 16 mA·cm$^{-2}$ over the palette geometric surface area. Discharge occurred under a constant pressure of 24 kPa.

Figure 7:
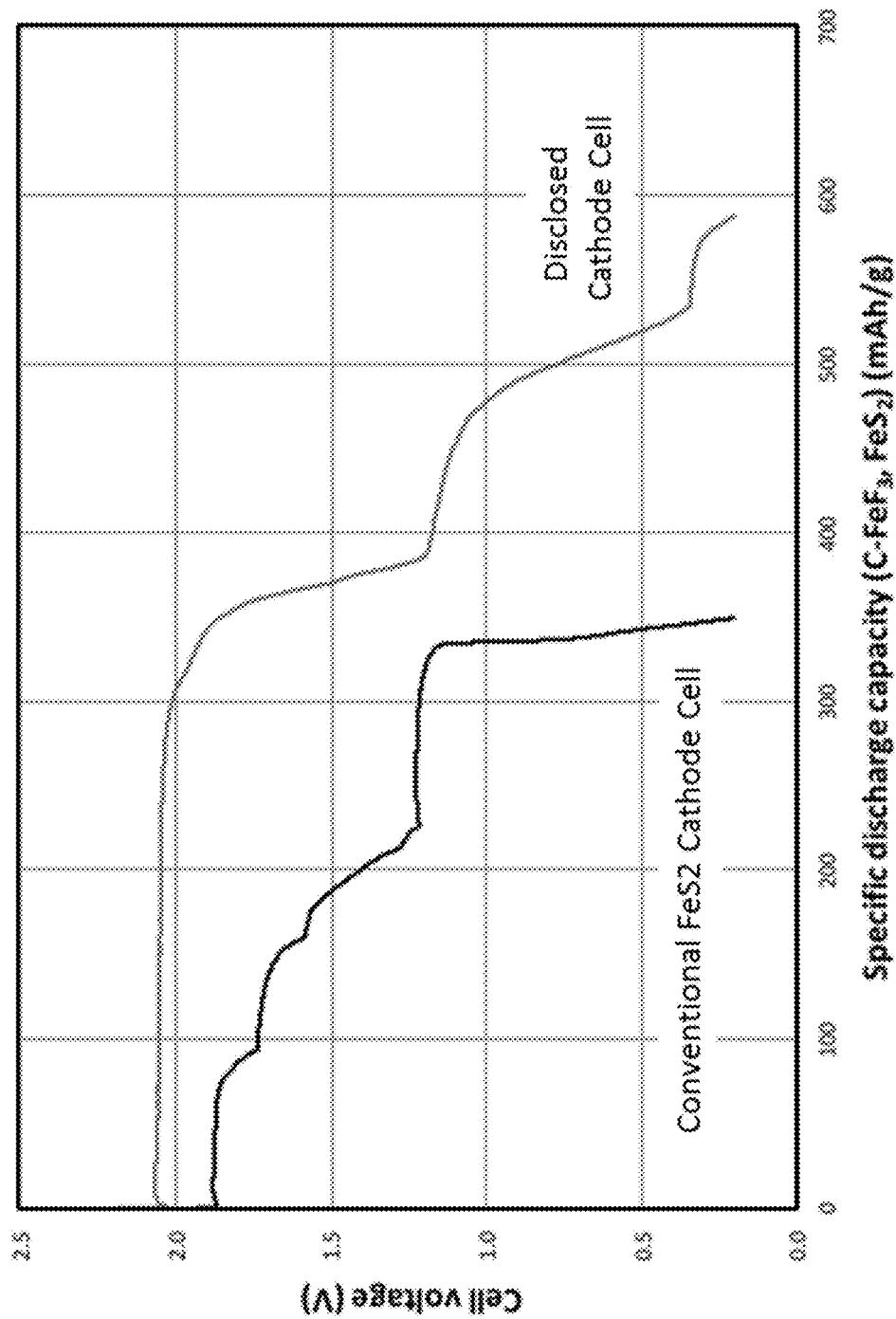
FIG. 7 shows a graph of representative discharge curve data comparing a cell comprising a conventional anode with a disclosed cathode to a cell comprising a conventional anode and cathode.

Data comparing the discharge curve for a disclosed anode test cell to a reference cell are shown in FIG. 7. The data show that at a cut-off voltage of 1V, the charge density of the disclosed cathode test cell is increased by a fatter greater than 1.4-fold along with an increase cell voltage of at least 190 mV.

Briefly, a disclosed anode/cathode test cell was prepared by placing an electrolyte palette between a disclosed anode palette comprising a disclosed anode composition and a disclosed cathode palette comprising a disclosed cathode compostion. The palettes were prepared as described herein above. Once assembled, the cell was heated to an operating temperature of 465° C. and discharged with a constant current density of 4 mA·cm$^{-2}$ over the palette geometric surface area. Discharge occurred under a constant pressure of 24 kPa.

For comparison, a reference cell was prepared. by placing an electrolyte palette between an anode palette comprising a conventional anode composition and a cathode palette comprising a conventional cathode compostion ("conventional mode-cathode test cell"). The palettes were prepared as described herein above. Once assembled, the cell was heated to an operating temperature of 465° C. and discharged with a constant current density of 16 mA·cm$^{-2}$ over the palette geometric surface area. Discharge occurred under a constant pressure of 24 kPa.

Figure 8:
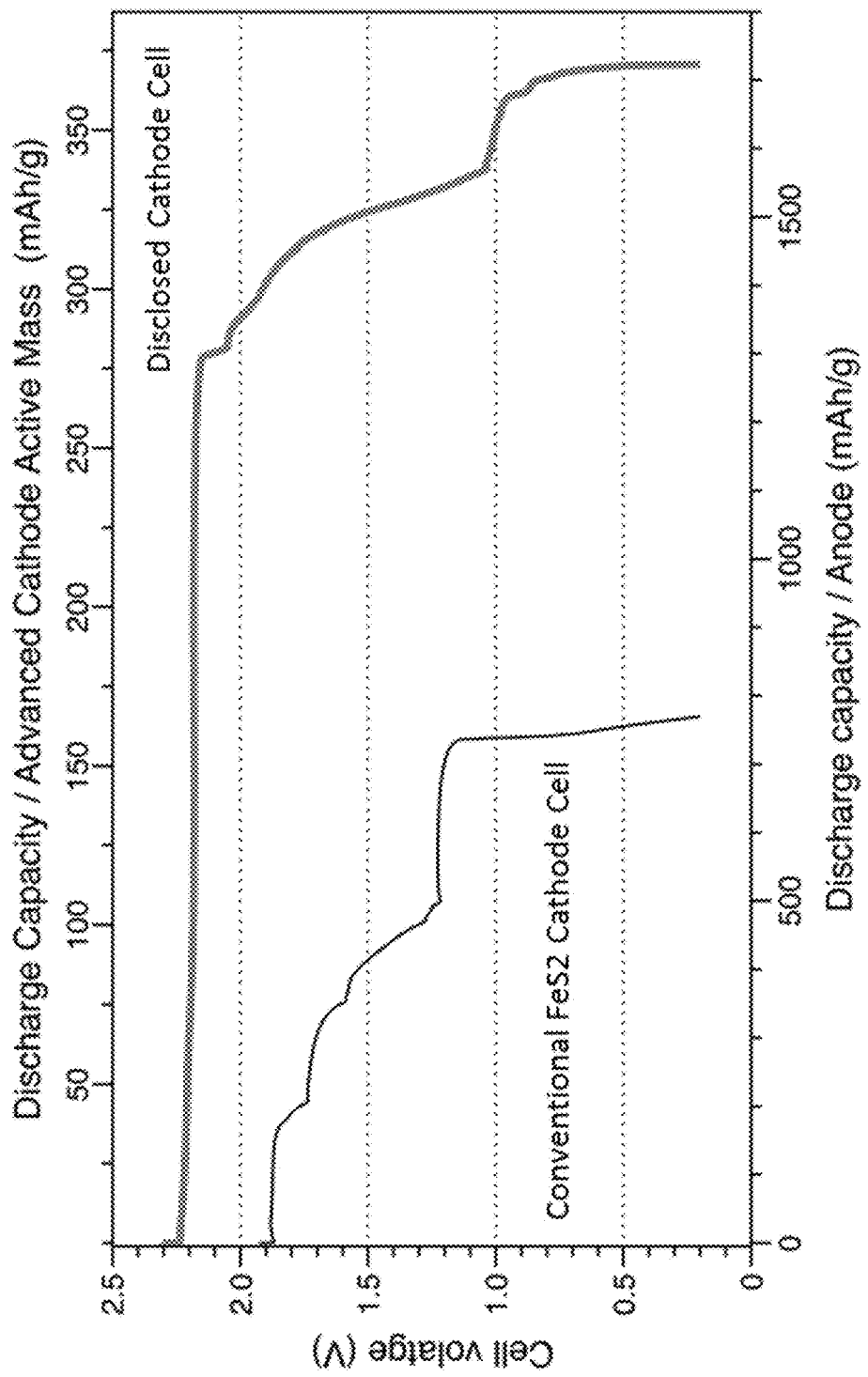
FIG. 8 shows a graph of representative discharge curve data comparing a cell comprising a disclosed anode and cathode to a cell comprising a conventional anode and cathode.

Data comparing the discharge curve for a disclosed anode/cathode test cell to a reference cell are shown in FIG. 8. The data show that the disclosed anode/cathode test cell had a higher discharge voltage of at least 345 mV; a flat voltage discharge curve increased discharge capacity per anode by greater than 3.2-foled; and an increased discharge energy at cell per mass of anode+cathode ref greater than 1.9-fold.

It will be apparent to those skilled in the art that various modifications and variations can be made in the present disclosure without departing from the scope or spirit of the disclosure. Other embodiments of the disclosure will be apparent to those skilled in the art from consideration. of the specification and practice of the disclosure disclosed herein. It is intended that the specification and examples be considered as exemplary only, with a true scope and spirit of the disclosure being indicated by the following claims.

The invention claimed is:

1. A thermal battery comprising an anode, a cathode, and an electrolyte; wherein the anode comprises a composition comprising a metallic lithium; a lithium alloy; and a lithium alloying additive; wherein the lithium alloy is Li—Si, Li—Al, Li—Ti, Li—V, Li—Mg, LiCoO$_2$, LiMnO$_2$, LiFePO$_4$; or Li—C, and wherein the total lithium content of the anode is in an amount of about 70 wt % to about 99 wt %.

2. The thermal battery of claim 1, wherein the battery operates at between 200-700° C.

3. The thermal battery of claim 1, wherein the metallic lithium comprises a protective coating.

4. The thermal battery of claim 3, wherein the protective coating is Li$_2$CO$_3$.

5. The thermal battery of claim 1, wherein the lithium alloying additive is Sn, Si, Al, Ti, V, Mg, Mn, Ge, C, S, Sb, Zn, Ge, CoO$_2$, NiO$_2$, MgO$_2$, FePO$_4$, MnPO$_4$, CoPO$_4$, NiPO$_4$, [Ni$_{1/3}$Mn$_{1/3}$Co$_{1/3}$]O$_2$, [Li$_{0.2}$Mn$_{0.6}$Ni$_{0.2}$]O$_2$, or [Ni$_{0.7}$Mn$_{0.15}$Co$_{0.15}$]O$_2$.

6. The thermal battery of claim 1, wherein the lithium alloy is Li—Si.

7. The thermal battery of claim 1, wherein the lithium alloying additive is present in an amount of about 1 wt % to about 25 wt %.

8. The thermal battery of claim 1, wherein the lithium alloy is present in an amount of about 10 wt % to about 20 wt %.

9. The thermal battery of claim 1, wherein the lithium alloying additive is Sn.

10. The thermal battery of claim 1, wherein the anode further comprises one or more of LiCl, LiBr, LiF, KCl, KBr, LiI, KI, a carbon nanotube, a carbon nanoparticle, graphene, MgO, CaO, SiO$_2$, Al$_2$O$_3$, TiO$_2$, ZrO$_2$, ZrSiO$_4$, a ceramic fiber, kaolin clay, fumed silica, fumed titania, alumina, or an inert oxide.

* * * * *